US011760845B2

(12) United States Patent
Higashi et al.

(10) Patent No.: US 11,760,845 B2
(45) Date of Patent: Sep. 19, 2023

(54) METHOD FOR PRODUCING RESIN PARTICLE DISPERSION, METHOD FOR PRODUCING TONER FOR ELECTROSTATIC IMAGE DEVELOPMENT, AND TONER FOR ELECTROSTATIC IMAGE DEVELOPMENT

(71) Applicant: FUJIFILM Business Innovation Corp., Tokyo (JP)

(72) Inventors: Kenji Higashi, Kanagawa (JP); Keita Yamamoto, Kanagawa (JP); Takashi Inukai, Kanagawa (JP); Kazuhiko Nakamura, Kanagawa (JP); Yuji Isshiki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/465,210

(22) Filed: Sep. 2, 2021

(65) Prior Publication Data

US 2022/0306817 A1 Sep. 29, 2022

(30) Foreign Application Priority Data

Mar. 25, 2021 (JP) .................. 2021-052449

(51) Int. Cl.
*C08J 3/09* (2006.01)
*G03G 9/093* (2006.01)
(Continued)

(52) U.S. Cl.
CPC .............. *C08J 3/095* (2013.01); *B01D 3/10* (2013.01); *B01D 3/42* (2013.01); *B01F 23/4105* (2022.01);
(Continued)

(58) Field of Classification Search
CPC ... C08J 3/095; B01D 3/10; B01D 3/42; B01F 23/4105; B01F 23/49; B01F 23/807;
(Continued)

(56) References Cited

U.S. PATENT DOCUMENTS

2013/0202998 A1* 8/2013 Higashi ................ G03G 9/0804
524/238
2018/0329321 A1* 11/2018 Nakamura ......... G03G 9/08711
(Continued)

FOREIGN PATENT DOCUMENTS

JP 2010-070612 A 4/2010
JP 2010-121059 A 6/2010

*Primary Examiner* — Ellen M McAvoy
(74) *Attorney, Agent, or Firm* — Sughrue Mion, PLLC

(57) ABSTRACT

Producing a resin particle dispersion using an apparatus including: two or more resin particle dispersion production lines each including an emulsification tank in which a resin is subjected to phase inversion emulsification using two or more organic solvents and an aqueous medium to obtain a phase-inverted emulsion, a distillation tank in which the organic solvents are removed from the phase-inverted emulsion by reduced pressure distillation to obtain a resin particle dispersion, and plural distillate collection tanks that collect distillates formed during the reduced pressure distillation according to respective target distillate compositions; and a reusable storage tank that collects and stores a distillate collected in at least one collection tank among the distillates collected in the plural collection tanks in each of the two or more production lines, and delivering the distillate to the emulsification tank in at least one production line to reuse the distillate for producing a phase-inverted emulsion.

19 Claims, 3 Drawing Sheets

(51) Int. Cl.
  *B01D 3/10*    (2006.01)
  *B01D 3/42*    (2006.01)
  *B01F 23/40*   (2022.01)
  *B01F 23/80*   (2022.01)
  *B01F 23/41*   (2022.01)

(52) U.S. Cl.
  CPC ............ *B01F 23/49* (2022.01); *B01F 23/807* (2022.01); *G03G 9/09307* (2013.01); *G03G 9/09392* (2013.01); *B01F 23/4142* (2022.01); *B01F 23/4146* (2022.01); *B01F 23/48* (2022.01)

(58) Field of Classification Search
  CPC .. B01F 23/4142; B01F 23/4146; B01F 23/48; G03G 9/09307; G03G 9/09392
  See application file for complete search history.

(56) References Cited

U.S. PATENT DOCUMENTS

| | | | |
|---|---|---|---|
| 2019/0265604 A1* | 8/2019 | Sumioka | G03G 9/09364 |
| 2020/0310270 A1* | 10/2020 | Nakashima | G03G 9/0821 |
| 2021/0132519 A1* | 5/2021 | Hashimoto | G03G 9/0821 |
| 2022/0306814 A1* | 9/2022 | Inukai | G03G 9/0806 |
| 2022/0306815 A1* | 9/2022 | Inukai | G03G 9/08755 |
| 2022/0306817 A1* | 9/2022 | Higashi | B01F 23/4105 |
| 2022/0308480 A1* | 9/2022 | Yamamoto | C08J 3/11 |
| 2022/0308481 A1* | 9/2022 | Yamamoto | G03G 9/0819 |

* cited by examiner

METHOD FOR PRODUCING RESIN PARTICLE DISPERSION, METHOD FOR PRODUCING TONER FOR ELECTROSTATIC IMAGE DEVELOPMENT, AND TONER FOR ELECTROSTATIC IMAGE DEVELOPMENT

CROSS-REFERENCE TO RELATED APPLICATIONS

This application is based on and claims priority under 35 USC 119 from Japanese Patent Application No. 2021-052449 filed Mar. 25, 2021.

BACKGROUND

(i) Technical Field

The present disclosure relates to a method for producing a resin particle dispersion, to a method for producing a toner for electrostatic image development, and to a toner for electrostatic image development.

(ii) Related Art

For example, Japanese Unexamined Patent Application Publication No. 2010-70612 discloses "an aqueous dispersion production apparatus including: an aqueous dispersion production bath for producing an aqueous dispersion; distillate composition detecting means for detecting the composition of a distillate collected from the aqueous dispersion production bath during removal of a solvent; two or more distillate collection baths for collecting distillates separated according to their composition; and supply means for supplying at least one of the distillates collected in the distillate collection baths to the aqueous dispersion production bath."

Japanese Unexamined Patent Application Publication No. 2010-121059 discloses "a system for producing an aqueous resin dispersion, the system including: an dispersion tank that contains an aqueous resin dispersion containing a resin, water, and an organic solvent; collecting means for collecting at least part of the water and the organic solvent from the aqueous resin dispersion; electric conductivity measuring means for measuring the electric conductivity of a collected solution containing at least one of the collected water and the collected organic solvent; classifying means for classifying the collected solution into classified solutions; weight measuring means for measuring the weight of each classified solution; controlling means for controlling the classifying means according to the measured electric conductivity and the measured weight; and supplying means for supplying one of the classified solutions that is composed mainly of water as water to be added during production."

SUMMARY

Aspects of non-limiting embodiments of the present disclosure relate to a resin particle dispersion production method that uses two or more resin particle dispersion production lines each including an emulsification tank in which a resin is subjected to phase inversion emulsification using two or more organic solvents and an aqueous medium to thereby obtain a phase-inverted emulsion, a distillation tank in which the organic solvents are removed from the phase-inverted emulsion by reduced pressure distillation to thereby obtain a resin particle dispersion, and a plurality of distillate collection tanks that collect distillates formed during the reduced pressure distillation according to respective target distillate compositions. With this method, the amount of waste distillates is smaller than that when the distillates are delivered directly from the distillate collection tanks to the emulsification tanks, supplied to the phase-inverted emulsions, and reused for the production of the phase-inverted emulsions.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a resin particle dispersion, the method including using a resin particle dispersion production apparatus including: two or more resin particle dispersion production lines each including an emulsification tank in which a resin is subjected to phase inversion emulsification using two or more organic solvents and an aqueous medium to thereby obtain a phase-inverted emulsion, a distillation tank in which the organic solvents are removed from the phase-inverted emulsion by reduced pressure distillation to thereby obtain a resin particle dispersion, and a plurality of distillate collection tanks that collect distillates formed during the reduced pressure distillation according to respective target distillate compositions; and a reusable distillate storage tank A that collects and stores a distillate collected in at least one distillate collection tank A among the distillates collected in the plurality of distillate collection tanks in each of the two or more resin particle dispersion production lines, wherein the distillate collected in the reusable distillate storage tank A is delivered to the emulsification tank in at least one resin particle dispersion production line of the two or more resin particle dispersion production lines to reuse the distillate for production of a phase-inverted emulsion in the at least one resin particle dispersion production line.

BRIEF DESCRIPTION OF THE DRAWINGS

Exemplary embodiments of the present disclosure will be described in detail based on the following figures, wherein.

DETAILED DESCRIPTION

Figure 1:
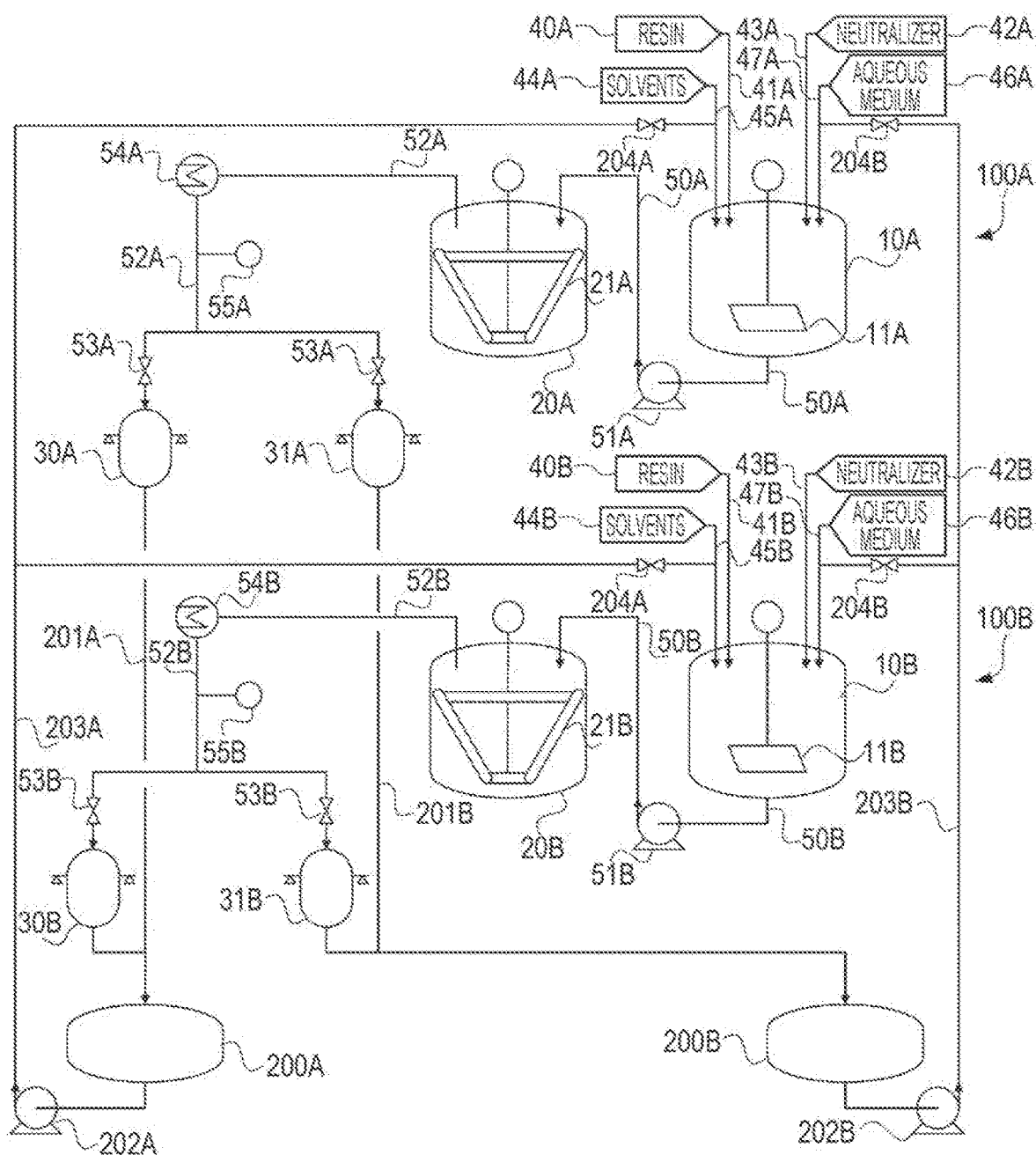
FIG. 1 is a schematic configuration diagram showing an example of a production apparatus used for a resin particle dispersion production method according to an exemplary embodiment.

Exemplary embodiments of the present disclosure will be described below. The description and Examples are illustrative of the present disclosure and are not intended to limit the scope of the present disclosure.

In the present specification, a numerical range represented using "to" means a range including the numerical values before and after the "to" as the minimum value and the maximum value, respectively.

In a set of numerical ranges expressed in a stepwise manner in the present specification, the upper or lower limit in one numerical range may be replaced with the upper or lower limit in another numerical range in the set. Moreover, in a numerical range described in the present specification, the upper or lower limit in the numerical range may be replaced with a value indicated in an Example.

In the present specification, the term "step" is meant to include not only an independent step but also a step that is not clearly distinguished from other steps, so long as the prescribed purpose of the step can be achieved.

In the present specification, when an exemplary embodiment is explained with reference to the drawings, the structure of the exemplary embodiment is not limited to the structure shown in the drawings. In the drawings, the sizes of the components are conceptual, and the relative relations between the components are not limited to these relations.

In the present specification, any component may contain a plurality of materials corresponding to the component. In the present disclosure, when reference is made to the amount of a component in a composition, if the composition contains a plurality of materials corresponding to the component, the amount means the total amount of the plurality of materials, unless otherwise specified.

In the present specification, the "toner for electrostatic image development" may be referred to simply as a "toner."
<Resin Particle Dispersion Production Method>

A resin particle dispersion production method according to an exemplary embodiment uses a resin particle dispersion production apparatus including:

two or more resin particle dispersion production lines each including an emulsification tank in which a resin is subjected to phase inversion emulsification using two or more organic solvents and an aqueous medium to thereby obtain a phase-inverted emulsion, a distillation tank in which the organic solvents are removed from the phase-inverted emulsion by reduced pressure distillation to thereby obtain a resin particle dispersion, and a plurality of distillate collection tanks that collect distillates formed during the reduced pressure distillation according to respective target distillate compositions; and a reusable distillate storage tank A that collects and stores a distillate collected in at least one distillate collection tank A among the distillates collected in the plurality of distillate collection tanks in each of the two or more resin particle dispersion production lines.

In the resin particle dispersion production method according to the present exemplary embodiment, the distillate in the reusable distillate storage tank A is delivered to the emulsification tank in at least one resin particle dispersion production line of the two or more resin particle dispersion production lines to reuse the distillate for production of the phase-inverted emulsion produced in the at least one resin particle dispersion production line.

In a conventional resin particle dispersion production method using a phase inversion emulsification method, organic solvents are removed from a phase-inverted emulsion in a distillation tank by reduced pressure distillation to thereby obtain a resin particle dispersion. In this case, the distillate formed during the reduced pressure distillation is collected in a distillate collection tank. Part of the distillate collected in the distillate collection tank is reused for production of a phase-inverted emulsion.

When a resin particle dispersion is produced using a production apparatus including two or more resin particle dispersion production lines, the reuse rate of the distillates is low, and the amount of waste distillates is large. This is because the ratio and amounts of the organic solvents that are necessary for the phase inversion emulsification vary significantly depending on the type of resin and the physical properties of the resin.

However, in the resin particle dispersion production method according to the present exemplary embodiment, distillates are collected in the plurality of distillate collection tanks in each of the two or more resin particle dispersion production lines, and the distillate collected in the at least one distillate collection tank A in each of the two or more resin particle dispersion production lines is collected and stored in the reusable distillate storage tank A. The distillate stored in the reusable distillate storage tank A is delivered to the emulsification tank in at least one production line of the two or more resin particle dispersion production lines and used for the production of a phase-inverted emulsion in the at least one production line.

Specifically, the distillates collected in the distillate collection tanks in the two or more resin particle dispersion production lines are mixed and stored in the reusable distillate storage tank A. In this manner, the mixing ratio of the two or more organic solvents in the distillate stored in the reusable distillate storage tank A is leveled. Therefore, even when two or more resins with different organic solvent ratios are used to produce resin particle dispersions irregularly, fluctuations in the ratio of the two or more organic solvents in the distillate stored in the reusable distillate storage tank A can be reduced. In this case, the reuse rate of the distillates can be maximized, and the amount of waste distillates can be reduced.

The resin particle dispersion production method according to the present exemplary embodiment will be described in more detail.

(Resin Particle Dispersion Production Apparatus)

First, the outline of a resin particle dispersion production apparatus used for the resin particle dispersion production method according to the present exemplary embodiment will be described.

FIG. 1 is a schematic configuration diagram showing an example of the resin particle dispersion production apparatus used for the resin particle dispersion production method according to the present exemplary embodiment.

The production apparatus shown in FIG. 1 includes: a first resin particle dispersion production line 100A; a second resin particle dispersion production line 100B; a first reusable distillate storage tank 200A (an example of the reusable distillate storage tank A); and a second reusable distillate storage tank 200B (an example of a reusable distillate storage tank B). The number of production lines is not limited to two and may be three or more.

The first and second production lines 100A and 100B respectively include emulsification tanks 10A and 10B, distillation tanks 20A and 20B, first distillate collection tanks 30A and 30B (examples of the distillate collection tank A), and second distillate collection tanks 31A and 31B (examples of a distillate collection tank B).

The emulsification tanks 10A and 10B are each used to subject a resin to phase inversion emulsification using two or more organic solvents and an aqueous medium to thereby obtain a phase-inverted emulsion.

Agitators 11A and 11B each used to agitate raw materials to subject the resins to phase inversion emulsification are disposed inside the emulsification tanks 10A and 10B, respectively.

Resin supply tubes 41A and 41B, neutralizer supply tubes 43A and 43B, organic solvent supply tubes 45A and 45B, and aqueous medium supply tubes 47A and 47B for supplying the resins, a neutralizer, the organic solvents, and the aqueous medium are connected to the emulsification tanks 10A and 10B, respectively.

The resin supply tubes 41A and 41B, the neutralizer supply tubes 43A and 43B, the organic solvent supply tubes 45A and 45B, and the aqueous medium supply tubes 47A and 47B are respectively connected to resin tanks 40A and 40B, neutralizer tanks 42A and 42B, organic solvent tanks 44A and 44B, and aqueous medium tanks 46A and 46B.

Organic solvent mixtures each prepared by mixing two or more organic solvents are contained in the respective organic solvent tanks 44A and 44B. However, each of the emulsification tanks 10A and 10B may be connected to organic solvent supply tubes connected to two or more organic solvent tanks containing respective organic solvents to supply these organic solvents to the each of the emulsification tanks 10A and 10B.

Although not illustrated, well-known members for producing the phase-inverted emulsions such as heating units (so-called jackets) for heating tank walls of the emulsification tanks 10A and 10B are provided for the emulsification tanks 10A and 10B.

The distillation tanks 20A and 20B are used to remove the organic solvents from the phase-inverted emulsions by reduced pressure distillation to thereby obtain resin particle dispersions.

Agitators 21A and 21B that agitate the phase-inverted emulsions are disposed inside the distillation tanks 20A and 20B, respectively.

Although not illustrated, well-known members for subjecting the phase-inverted emulsions to reduced pressure distillation such as heating units (so-called jackets) for heating tank walls of the distillation tanks 20A and 20B are provided for the distillation tanks 20A and 20B.

The first distillate collection tanks 30A and 30B and the second distillate collection tanks 31A and 31B collect distillates formed during reduced pressure distillation according to respective distillate compositions. The number of distillate collection tanks is not limited to two and may be three or more.

The first reusable distillate storage tank 200A collects and stores distillates collected in the first distillate collection tanks 30A and 30B in the first and second production lines 100A and 100B.

The second reusable distillate storage tank 200B collects and stores distillates collected in the second distillate collection tanks 31A and 31B in the first and second production lines 100A and 100B.

The number of reusable distillate storage tanks is not limited to two and may be one or three or more.

The emulsification tanks 10A and 10B are respectively connected to the distillation tanks 20A and 20B through emulsion delivery tubes 50A and 50B by way of pumps 51A and 51B.

The distillation tanks 20A and 20B are respectively connected to the first distillate collection tanks 30A and 30B and the second distillate collection tanks 31A and 31B through solvent discharge tubes 52A and 52B by way of valves 53A and 53B.

Specifically, the solvent discharge tubes 52A and 52B are branched at intermediate points to connect the distillation tanks 20A and 20B to the first distillate collection tanks 30A and 30B, respectively, and connect the distillation tanks 20A and 20B to the second distillate collection tanks 31A and 31B, respectively.

Condensers 54A and 54B for condensing the organic solvents and the aqueous medium evaporated from the phase-inverted emulsions contained in the distillation tanks 20A and 20B during reduced pressure distillation and analysis units 55A and 55B for analyzing the compositions of the distillates are disposed at intermediate points in the solvent discharge tubes 52A and 52B.

The first distillate collection tanks 30A and 30B are connected to the first reusable distillate storage tank 200A through a first distillate delivery tube 201A. Specifically, the first distillate delivery tube 201A is branched at an intermediate point to connect the first distillate collection tank 30A to the first reusable distillate storage tank 200A and connect the first distillate collection tank 30B to the first reusable distillate storage tank 200A.

The second distillate collection tanks 31A and 31B are connected to the second reusable distillate storage tank 200B through a second distillate delivery tube 201B.

Specifically, the second distillate delivery tube 201B is branched at an intermediate point to connect the second distillate collection tank 31A to the second reusable distillate storage tank 200B and connect the second distillate collection tank 31B to the second reusable distillate storage tank 200B.

The first reusable distillate storage tank 200A is connected to the emulsification tanks 10A and 10B through a first stored distillate delivery tube 203A by way of a pump 202A and valves 204A.

Specifically, the first stored distillate delivery tube 203A is branched at an intermediate point to connect the first reusable distillate storage tank 200A to the emulsification tank 10A and connect the first reusable distillate storage tank 200A to the emulsification tank 10B. The first stored distillate delivery tube 203A is connected to intermediate points of the organic solvent supply tubes 45A and 45B.

The second reusable distillate storage tank 200B is connected to the emulsification tanks 10A and 10B through a second stored distillate delivery tube 203B by way of a pump 202B and valves 204B.

Specifically, the second stored distillate delivery tube 203B is branched at an intermediate point to connect the second reusable distillate storage tank 200B to the emulsification tank 10A and connect the second reusable distillate storage tank 200B to the emulsification tank 10B. The second stored distillate delivery tube 203B is connected to intermediate points of the aqueous medium supply tubes 47A and 47B.

Next, steps in the resin particle dispersion production method according to the present exemplary embodiment will be described.

In the resin particle dispersion production method according to the present exemplary embodiment, a phase-inverted emulsion production step and an organic solvent removal step are performed in each of the first and second production lines 100A and 100B to obtain resin particle dispersions. Distillates are reused through a distillate collection step and a distillate reusing step.

(Phase-Inverted Emulsion Production Step)

In the phase-inverted emulsion production step, the organic solvents and the aqueous medium are used to subject resins to phase inversion emulsification in the emulsification tanks 10A and 10B to thereby obtain phase-inverted emulsions.

In a phase inversion emulsification method, an aqueous medium (i.e., a W phase) is added to an oil phase dispersion (i.e., a resin solution used as an O phase) that is a continuous phase containing a resin dissolved in an organic solvent capable of dissolving the resin to thereby subject the resin to conversion (i.e., phase inversion) from W/O to O/W. The oil phase dispersion is thereby converted to a discontinuous phase, and the resin is dispersed as particles in the aqueous medium.

Specifically, for example, organic solvent mixtures each prepared by mixing two or more organic solvents are supplied from the respective organic solvent tanks 44A and 44B through the organic solvent supply tubes 45A and 45B to the emulsification tanks 10A and 10B.

Next, while the organic solvent mixtures are agitated using the agitators 11A and 11B, the resins are supplied from the respective resin tanks 40A and 40B through the resin supply tubes 41A and 41B to the emulsification tanks 10A and 10B. The resins are thereby dissolved in the respective organic solvent mixtures.

Next, the neutralizer is supplied from the neutralizer tanks 42A and 42B through the neutralizer supply tubes 43A and 43B to the emulsification tanks 10A and 10B. The resins are thereby neutralized.

Next, the aqueous medium is supplied from the aqueous medium tanks 46A and 46B through the aqueous medium supply tubes 47A and 47B to the emulsification tanks 10A and 10B.

Then the mixtures in the emulsification tanks 10A and 10B are agitated and heated to subject the resins to phase inversion emulsification to thereby obtain phase-inverted emulsions.

The resins may be supplied after the organic solvent mixtures and the neutralizer have been supplied to the emulsification tanks 10A and 10B. Alternatively, after the resins have been supplied to the respective emulsification tanks 10A and 10B, the organic solvent mixtures may be supplied.

Next, the phase-inverted emulsions are delivered from the emulsification tanks 10A and 10B through the emulsion delivery tubes 50A and 50B to the distillation tanks 20A and 20B using the pumps 51A and 51B.

(Organic Solvent Removal Step)

In the organic solvent removal step, the organic solvents are removed from the phase-inverted emulsions in the distillation tanks 20A and 20B by reduced pressure distillation.

During the reduced pressure distillation, the organic solvents and the aqueous medium are evaporated under agitation and heating to remove the organic solvents from the phase-inverted emulsions. Resin particle dispersions are thereby obtained.

A well-known reduced pressure distillation method may be used, such as a method in which a reduced pressure distillation tank equipped with an agitator is used to perform reduced pressure distillation while a phase-inverted emulsion is bubbled with an inert gas or a method in which reduced pressure distillation is performed while a so-called wall wetter is used to draw up a phase-inverted emulsion in a phase-inverted emulsion tank to thereby form a liquid film on a heat transfer surface of the tank in a portion above the liquid level.

(Distillate Collection Step)

The organic solvents and the aqueous medium evaporated during the reduced pressure distillation in the distillation tanks 20A and 20B are delivered through the solvent discharge tubes 52A and 52B, condensed in the condensers 54A and 54B, and collected as distillates in the first distillate collection tanks 30A and 30B and the second distillate collection tanks 31A and 31B.

As for the compositions of the distillates, the concentration of the organic solvents is high at the beginning of the reduced pressure distillation, and the concentration of the aqueous medium is low. As the reduced pressure distillation proceeds, the concentration of the organic solvents deceases, and the concentration of the aqueous medium increases. When the concentrations of the organic solvents in the phase-inverted emulsions in the distillation tanks 20A and 20B (i.e., the concentrations of residual organic solvents) have reached target concentrations, the reduced pressure distillation is terminated.

Therefore, for example, at the beginning of the reduced pressure distillation, the distillates are collected in the first distillate collection tanks 30A and 30B. Then, when the concentrations of the aqueous medium in the distillates have reached target concentrations (in order words, when the concentrations of the organic solvents in the distillates have decreased to the target concentrations), the valves 53A and 53B are operated such that the distillates are collected in the second distillate collection tanks 31A and 31B. Specifically, the distillate collection tanks used for collecting the distillates are changed according to the target distillate compositions.

The target concentrations of the aqueous medium in the distillates are, for example, 80% by mass, 85% by mass, 90% by mass, or 95% by mass.

For example, distillates with an aqueous medium concentration of 80% by mass or more, 85% by mass or more, 90% by mass or more, or 95% by mass or more may be collected in the second distillate collection tanks 31A and 31B.

For example, distillates with an organic solvent concentration of 30% by mass or more, 40% by mass or more, 45% by mass or more, or 50% by mass or more may be collected in the first distillate collection tanks 30A and 30B.

The number of distillate collection tanks is not limited to two and may be three of more. When three or more distillate collection tanks are provided, distillates with three or more different aqueous medium concentrations (or organic solvent concentrations) may be collected in the distillate collection tanks.

The compositions of the distillates (specifically the concentrations of the aqueous medium or the concentrations of the organic solvents in the distillates) are obtained by analyzing the distillates using the analysis units 55A and 55B. The valves 53A and 53B are operated according to the analysis results, and the distillate collection tanks used to collect the distillates are changed according to the target distillate compositions.

The analysis units 55A and 55B can analyze the compositions of the distillates, and sensors such as electric conductivity meters are provided in the analysis units 55A and 55B. However, the distillates may be collected from the solvent discharge tubes 52A and 52B, and the compositions of the collected distillates may be analyzed.

For example, the analysis may be performed using at least one type of measurement selected from the group consisting of gas chromatography measurement, liquid chromatography measurement, infrared spectroscopy measurement, ultrasonic propagation velocity measurement, neutralization titration, specific gravity measurement, and electric conductivity measurement. The degree of change in the composition of a distillate during reduced pressure distillation can be experimentally determined in advance. Therefore, by measuring the weights of the distillates, the compositions of the distillates can be judged. The weights of the distillates can be measured, for example, by providing weight meters in the first distillate collection tanks 30A and 30B to measure the weights.

Specifically, for example, the compositions of the distillates are analyzed using at least one type of measurement selected from the group consisting of weight measurement, gas chromatography measurement, liquid chromatography measurement, infrared spectroscopy measurement, ultrasonic propagation velocity measurement, neutralization titration, specific gravity measurement, and electric conductivity measurement, and then the distillate collection tanks used to collect the distillates are changed according to the target distillate compositions.

(Reusing Step)

—First Reusable Distillate Storage Tank 200A—

The distillates collected in the first distillate collection tanks 30A and 30B are delivered through the first distillate delivery tube 201A to the first reusable distillate storage tank 200A, then mixed, and stored.

The distillate stored in the first reusable distillate storage tank 200A is delivered through the first stored distillate delivery tube 203A to the emulsification tanks 10A and 10B by operating the pump 202A and the valves 204A and reused for the production of phase-inverted emulsions. The distillate may be delivered to one of the emulsification tanks 10A and 10B and reused for the production of a phase-inverted emulsion in the one of the emulsification tanks 10A and 10B.

The distillate stored in the first reusable distillate storage tank 200A may contain the organic solvents in an amount of 30% by mass or more. The distillate stored in the first reusable distillate storage tank 200A and containing the organic solvents in an amount of 30% by mass or more is delivered as the organic solvents to the emulsification tanks 10A and 10B. In this manner, the reuse rate of the distillates as the organic solvents increases, and the amount of waste distillates is reduced.

The amount of the organic solvents in the distillate stored in the first reusable distillate storage tank 200A is adjusted by the amounts of the organic solvents in the distillates collected in the first distillate collection tanks 30A and 30B and the mixing ratios.

From the viewpoint of improving the reuse rate of the distillates and reducing the amount of waste distillates, the distillate stored in the first reusable distillate storage tank 200A contains the organic solvents in an amount of preferably 40% by mass or more, more preferably 45% by mass or more, and still more preferably 50% by mass or more.

The upper limit of the amount of the organic solvents in the distillate stored in the first reusable distillate storage tank 200A is, for example, 100% by mass or less.

The amount of the distillate stored in the first reusable distillate storage tank 200A and to be reused (i.e., the amount of the distillate to be delivered) may be determined using the mixing ratio of the two or more organic solvents in the distillate stored in the first reusable distillate storage tank 200A and the mixing ratios of the two or more organic solvents at the time of production of the phase-inverted emulsions.

Specifically, the amount of the distillate to be reused may be determined as follows.

First, the amounts of the organic solvents are determined according to the type of resin and the physical properties of the resin. The amounts of the organic solvents in a given amount of the distillate in the first reusable distillate storage tank 200A are computed by multiplying the concentrations of the organic solvents by the amount of the distillate. The amount of the distillate to be reused is determined such that the amount of any of the organic solvents in the distillate is equal to the above-determined amount of the any of the organic solvents.

The reuse rate of the distillates is thereby increased, and the amount of waste distillates is further reduced.

The mixing ratio of the two or more organic solvents in the distillate stored in the first reusable distillate storage tank 200A can be computed using the mixing ratios of the two or more organic solvents at the time of production of the phase-inverted emulsions, the amounts of the distillates collected in the distillate collection tanks A, and the amount of the distillate stored in the first reusable distillate storage tank 200A.

Specifically, the mixing ratio of the two or more organic solvents in the distillate stored in the first reusable distillate storage tank 200A can be computed as follows.

The amounts of the organic solvents determined in the first and second production lines 100A and 100B are summed, and the sums of the amounts of the organic solvents are divided by the total amount of the organic solvents. The mixing ratio of the organic solvents can thereby be computed. In this case, by taking the recovery ratios of the organic solvents collected in the condensers 54A and 54B measured in advance into consideration, the mixing ratio of the organic solvents can be computed with higher accuracy.

The mixing ratio of the two or more organic solvents in the distillate stored in the first reusable distillate storage tank 200A may be measured by subjecting the distillate stored in the first reusable distillate storage tank 200A to at least one type of measurement selected from the group consisting of gas chromatography measurement, liquid chromatography measurement, infrared spectroscopy measurement, ultrasonic propagation velocity measurement, neutralization titration, specific gravity measurement, and electric conductivity measurement.

—Second Reusable Distillate Storage Tank 200B—

The distillates collected in the second distillate collection tanks 31A and 31B are delivered through the second distillate delivery tube 201B to the second reusable distillate storage tank 200B, then mixed and stored.

The distillate stored in stored in the second reusable distillate storage tank 200B is delivered through the second stored distillate delivery tube 203B to the emulsification tanks 10A and 10B by operating the pump 202B and the valves 204B and reused for the production of phase-inverted emulsions. The distillate may be delivered to one of the emulsification tanks 10A and 10B and reused for the production of a phase-inverted emulsion in the one of the emulsification tanks 10A and 10B.

The distillate stored in the second reusable distillate storage tank 200B may contain the aqueous medium in an amount of 80% by mass or more. The distillate stored in the second reusable distillate storage tank 200B and containing the aqueous medium in an amount of 80% by mass or more is delivered as the aqueous medium to the emulsification tanks 10A and 10B. In this manner, the reuse rate of the distillates as the aqueous medium increases, and the amount of waste distillates is reduced.

The amount of the aqueous medium in the distillate stored in the second reusable distillate storage tank 200B is adjected by the amounts of the aqueous medium in the distillates collected in the second distillate collection tanks 31A and 31B and the mixing ratios.

From the viewpoint of improving the reuse rate of the distillates and reducing the amount of waste distillates, the distillate stored in the second reusable distillate storage tank 200B contains the aqueous medium in an amount of preferably 85% by mass or more, more preferably 90% by mass or more, and still more preferably 95% by mass or more.

The upper limit of the amount of the aqueous medium in the distillate stored in the second reusable distillate storage tank 200B is, for example, 100% by mass or less.

The distillate stored in the second reusable distillate storage tank 200B and containing the aqueous medium in an amount of 80% by mass or more may be delivered to the emulsification tanks 10A and 10B after the resins have been subjected to phase inversion emulsification using the two or more organic solvents and the aqueous medium.

By adding, as a replenishment aqueous medium, the distillate stored in the second reusable distillate storage tank 200B and containing the aqueous medium in an amount of 80% by mass or more to a phase-inverted emulsion prepared by subjecting a resin to phase inversion emulsification, the distillate can be reused, and the amount of waste distillates can be reduced.

In the resin particle dispersion production method according to the present exemplary embodiment, the resin particle dispersions are produced in the first and second production lines 100A and 100B through the phase-inverted emulsion production step and the organic solvent removal step. These steps are repeated in the next cycle, and the resin particle dispersions are repeatedly produced.

In the resin particle dispersion production method according to the present exemplary embodiment, the resin particle dispersions are produced in the first and second production lines 100A and 100B. In this case, at least one of the types of two or more organic solvents, the mixing ratio of the two or more organic solvents, and the type of the resin used in the first production line 100A may differ from that in the second production line 100B, or the types of two or more organic solvents, the mixing ratio of the two or more organic solvents, and the type of the resin in the first production line 100A may be the same as those in the second production line 100B.

In the resin particle dispersion production method according to the present exemplary embodiment, at least one of the types of two or more organic solvents, the mixing ratio of the two or more organic solvents, and the type of the resin in each of the first and second production lines 100A and 100B may be changed for each production cycle to produce resin particle dispersions or may be the same for each production cycle to produce resin particle dispersions.

With the above-described resin particle dispersion production method according to the present exemplary embodiment, the amount of waste distillates can be reduced.

In the description of the resin particle dispersion production method according to the present exemplary embodiment, the number of distillate collection tanks is two. However, three or more distillate collection tanks may be provided as described above.

Figure 2:
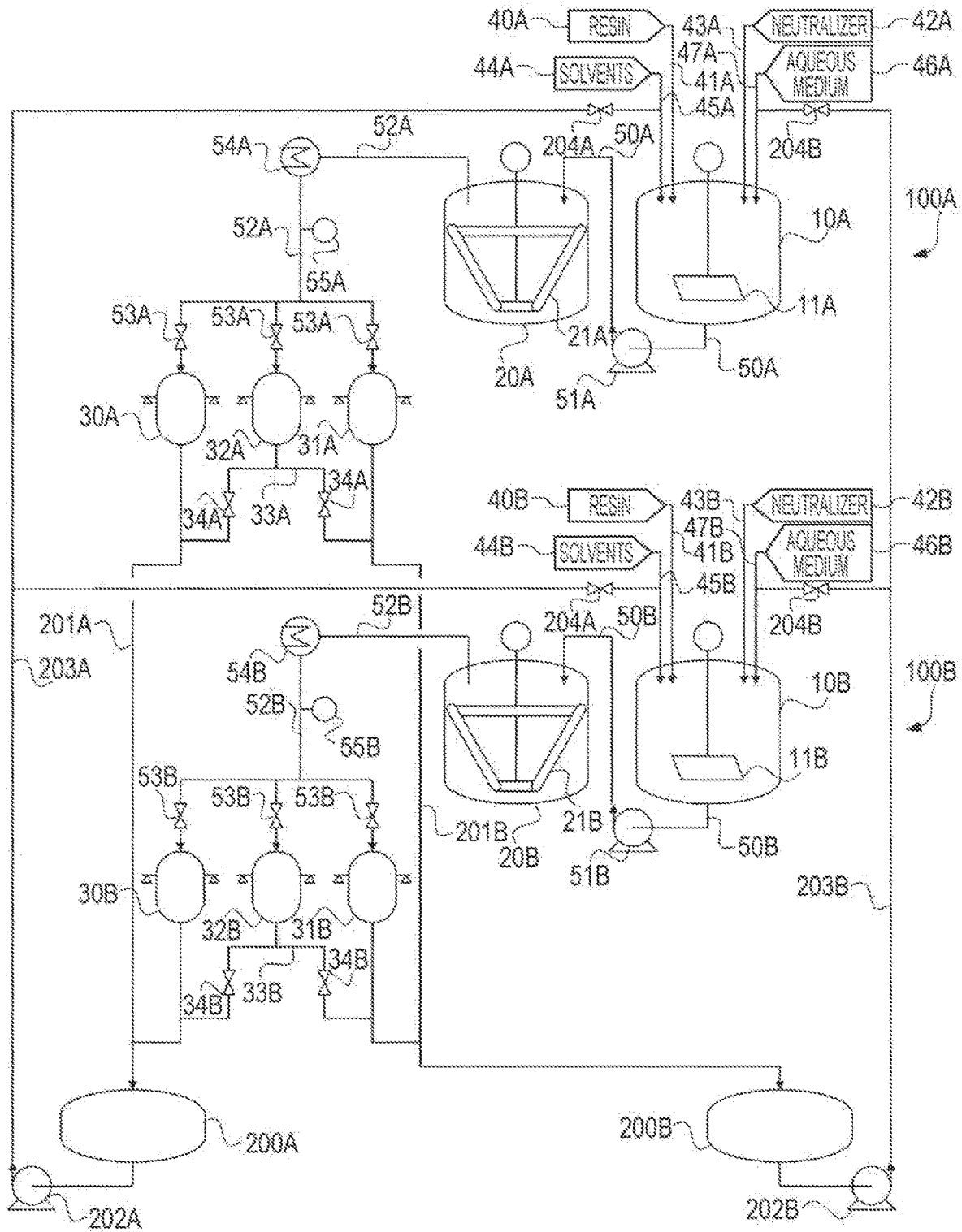
FIG. 2 is a schematic configuration diagram showing another example of the production apparatus used for the resin particle dispersion production method according to the exemplary embodiment.

For example, in the resin particle dispersion production method according to the present exemplary embodiment, a production apparatus including third distillate collection tanks 32A and 32B may be used as shown in FIG. 2.

The third distillate collection tanks 32A and 32B are connected to the distillation tanks 20A and 20B through the solvent discharge tubes 52A and 52B.

The third distillate collection tanks 32A and 32B are connected to the first distillate delivery tube 201A and also to the second distillate delivery tube 201B through third distillate delivery tubes 33A and 33B by way of valves 34A and 34B. By operating the valves 34A and 34B, the distillates collected in the third distillate collection tanks 32A and 32B can be delivered to one or both of the first reusable distillate storage tank 200A and the second reusable distillate storage tank 200B.

In the production apparatus shown in FIG. 2, structures other than the above structure are the same as those in the production apparatus shown in FIG. 1, and the description thereof will be omitted.

In the resin particle dispersion production method according to the present exemplary embodiment that uses the production apparatus shown in FIG. 2, the third distillate collection tanks 32A and 32B are provided. The amount of a distillate at which the concentration of the aqueous medium in the distillate becomes 95% or more varies depending on the mixing ratio of the organic solvents and the amounts of the organic solvents. However, even when this amount is changed largely, the third distillate collection tanks can be used as buffer tanks. In this manner, the amount of waste distillates can be further reduced.

Various materials used for the resin particle dispersion production method according to the present exemplary embodiment will be described.

—Resins—

Any resin that can undergo phase inversion emulsification can be used.

Examples of the resin include: vinyl-based resins composed of homopolymers of monomers such as styrenes (such as styrene, p-chlorostyrene, and α-methylstyrene), (meth) acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene); and vinyl-based resins composed of copolymers of combinations of two or more of the above monomers.

Other examples of the resin include: non-vinyl-based resins such as epoxy resins, polyester resins, polyurethane resins, polyamide resins, cellulose resins, polyether resins, and modified rosins; mixtures of the non-vinyl-based resins and the above-described vinyl-based resins; and graft polymers obtained by polymerizing a vinyl-based monomer in the presence of any of these resins.

One of these resins may be used alone, or two or more of them may be used in combination.

The resin may have a polar group such as a carboxyl group, a sulfonic acid group, or a hydroxy group. In particular, the resin may have an acid value.

The resin used may be an amorphous resin. However, a crystalline resin (such as a crystalline polyester resin) may be used.

The amorphous resin exhibits only a stepwise endothermic change instead of a clear endothermic peak in thermal analysis measurement using differential scanning calorimetry (DSC), is a solid at room temperature, and is thermoplastic at temperature equal to or higher than its glass transition temperature.

The crystalline resin exhibits a clear endothermic peak instead of a stepwise endothermic change in the differential scanning calorimetry (DSC).

Specifically, the crystalline resin means that, for example, the half width of the endothermic peak measured at a heating rate of 10° C./minute is 10° C. or less, and the amorphous resin means a resin in which the half width exceeds 10° C. or a resin in which a clear endothermic peak is not observed.

The amorphous resin will be described.

Examples of the amorphous resin include well-known amorphous resins such as amorphous polyester resins, amorphous vinyl resins (such as styrene-acrylic resins), epoxy resins, polycarbonate resins, and polyurethane resins. Of these, amorphous polyester resins, and amorphous vinyl resins (particularly styrene-acrylic resins) resins are preferred, and amorphous polyester resins are more preferred.

The amorphous resin may be a combination of an amorphous polyester resin and a styrene-acrylic resin. Moreover, the amorphous resin used may be an amorphous resin having an amorphous polyester resin segment and a styrene acrylic resin segment.

Amorphous Polyester Resin

The amorphous polyester resin is, for example, a polycondensation product of a polycarboxylic acid and a polyhydric alcohol. The amorphous polyester resin used may be a commercial product or a synthesized product.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acids, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl (having, for example, 1 to 5 carbon atoms) esters thereof. In particular, the polycarboxylic acid may be an aromatic dicarboxylic acid.

The polycarboxylic acid used may be a combination of a dicarboxylic acid and a tricarboxylic or higher polycarboxylic acid having a crosslinked or branched structure. Examples of the tricarboxylic or higher polycarboxylic acid include trimellitic acid, pyromellitic acid, anhydrides thereof, and lower alkyl (having, for example, 1 to 5 carbon atoms) esters thereof.

One of these polycarboxylic acids may be used alone, or two or more of them may be used in combination.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). In particular, the polyhydric alcohol is, for example, preferably an aromatic diol or an alicyclic diol and more preferably an aromatic diol.

The polyhydric alcohol used may be a combination of a diol and a trihydric or higher polyhydric alcohol having a crosslinked or branched structure. Examples of the trihydric or higher polyhydric alcohol include glycerin, trimethylolpropane, and pentaerythritol.

One of these polyhydric alcohols may be used alone, or two or more of them may be used in combination.

The amorphous polyester resin is obtained by a well-known production method. Specifically, the amorphous polyester resin is obtained, for example, by the following method. The polymerization temperature is set to from 180° C. to 230° C. inclusive. If necessary, the pressure inside the reaction system is reduced, and the reaction is allowed to proceed while water and alcohol generated during condensation are removed. When the raw material monomers are not dissolved or not compatible with each other at the reaction temperature, a high-boiling point solvent may be added as a solubilizer to dissolve the monomers. In this case, the polycondensation reaction is performed while the solubilizer is removed by evaporation. When a monomer with poor compatibility is present during the copolymerization reaction, the monomer with poor compatibility and an acid or an alcohol to be polycondensed with the monomer are condensed in advance, and then the resulting polycondensation product and the rest of the components are subjected to polycondensation.

The properties of the resin will be described.

The acid value of the resin is preferably from 8 mg KOH/g to 20 mg KOH/g inclusive and more preferably from 10 mg KOH/g to 16 mg KOH/g inclusive.

The acid value is determined by a neutralization titration method specified in JIS K0070 (1992). Specifically, the acid value is determined as follows.

An appropriate amount of a sample is collected, and 100 mL of a solvent (a solution mixture of diethyl ether/ethanol) and a few drops of an indicator (phenolphthalein solution) are added. Then the mixture is well-shaken in a water bath until the sample is completely dissolved. The mixture is titrated with a 0.1 mol/L potassium hydroxide ethanol solution. The point when the light red color of the indicator does not disappear for 30 seconds is defined as the end point. The acid value is denoted as A, and the weight of the sample is denoted as S (g). The volume of the 0.1 mol/L potassium hydroxide ethanol solution used for the titration is denoted as B (mL), and the factor of the 0.1 mol/L potassium hydroxide ethanol solution is denoted as f. Then the acid value is computed as $A=(B \times f \times 5.611)/S$.

The glass transition temperature (Tg) of the resin is preferably from 50° C. to 80° C. inclusive and more preferably from 50° C. to 65° C. inclusive.

The glass transition temperature is measured using a differential scanning calorimeter (DSC3110 manufactured by Mac Science Co., Ltd., thermal analysis system 001) according to JIS 7121-1987. The melting point of a mixture of indium and zinc is used to correct the temperature of a detection unit of the above apparatus, and the heat of fusion of indium is used to correct the amount of heat. A sample is placed in an aluminum pan. The aluminum pan with the sample placed therein and an empty reference pan are set in the apparatus, and the measurement is performed at a heating rate of 10° C./min.

The glass transition temperature is defined as the temperature at the intersection of the base line in an endothermic portion in the DSC curve obtained by the measurement and an extension of a rising line.

The weight average molecular weight (Mw) of the resin is preferably from 5000 to 1000000 inclusive and more preferably from 7000 to 500000 inclusive.

The number average molecular weight (Mn) of the resin may be from 2000 to 100000 inclusive.

The molecular weight distribution Mw/Mn of the resin is preferably from 1.5 to 100 inclusive and more preferably from 2 to 60 inclusive.

The weight average molecular weight and the number average molecular weight are measured by gel permeation chromatography (GPC). In the molecular weight measurement by GPC, a GPC measurement apparatus HLC-8120GPC manufactured by TOSOH Corporation is used. A TSKgel Super HM-M (15 cm) column manufactured by TOSOH Corporation and a THF solvent are used. The weight average molecular weight and the number average molecular weight are computed from the measurement results using a molecular weight calibration curve produced using monodispersed polystyrene standard samples.

No particular limitation is imposed on the amount of the resin used, and the amount may be appropriately selected according to the concentration of solids in the resin particle dispersion to be obtained.

—Neutralizer—

Examples of the neutralizer include basic compounds capable of neutralizing polar groups in the resin such as carboxyl groups, sulfonic acid groups, or hydroxy groups.

Specific examples of the neutralizer include organic bases and inorganic alkalis.

Examples of the organic base include triethanolamine, diethanolamine, N-methyldiethanolamine, and dimethylethanolamine.

Examples of the inorganic alkali include hydroxides of alkali metals (such as sodium hydroxide, lithium hydroxide, and potassium hydroxide), carbonates (such as sodium carbonate and sodium hydrogencarbonate), and ammonia.

To prevent hydrolysis of the resin, the neutralizer is preferably an amine, which is a weak base, and more preferably ammonia. Particularly preferably, ammonia in the form of an aqueous ammonia solution is added.

The rate of neutralization of the resin with the neutralizer is 60% or more and less than 150%. From the viewpoint of improving the yield and narrowing the size distribution, the neutralization rate is preferably 60% or more and less than 145% and still more preferably 65% or more and 140% or less.

Specifically, the neutralizer is used such that the rate of neutralization of the resin falls within the above range.

The rate of neutralization of the resin is measured as follows.

The acid value of the resin is denoted as AV [mg-KOH/g-resin], and the valence of the neutralizer (i.e., the basic material) added is denoted as n. The molecular weight of the neutralizer (i.e., the basic material) added is denoted as Mwb. The amount of the neutralizer (i.e., the basic material) added per 1 g of the resin is denoted as mb [g]. Then the rate of neutralization of the resin is computed using the following formula.

The rate of neutralization of the resin [%]=mb×n×56.1/Mwb/AV×1000

—Organic Solvent—

Examples of the organic solvent include well-known solvents used for phase inversion emulsification.

From the viewpoint of improving the solubility of the resin, the organic solvent may contain at least one organic solvent selected from the group consisting of esters and ketones and at least one organic solvent selected from the group consisting of alcohols.

Examples of the ester include ethyl acetate, butyl acetate, propyl acetate, and isopropyl acetate.

Examples of the ketone include acetone, methyl ethyl ketone, cyclohexanone, butanone, and methyl isobutyl ketone.

Examples of the alcohol include methanol, ethanol, isopropyl alcohol, n-propanol, n-butanol, diacetone alcohol, and 2-ethylhexanol.

—Aqueous Medium—

The aqueous medium used is, for example, water (such as distilled water or ion exchanged water).

The amount of water added to the oil phase medium prepared by dissolving the resin in the organic solvent is set to, for example, an amount that allows phase inversion emulsification to proceed and the amount of waste generated to decrease.

Specifically, the amount of water added is preferably from 50% by mass to 2000% by mass inclusive and more preferably from 100% by mass to 1000% by mass inclusive based on the mass of the resin.

A surfactant may be added to the resin particle dispersion obtained by the resin particle dispersion production method according to the present exemplary embodiment.

When the resin particle dispersion contains a surfactant, the dispersibility of the resin particles may be increased, and the storage stability of the dispersion may be improved.

Examples of the surfactant include various surfactants such as anionic surfactants, amphoteric surfactants, cationic surfactants, and nonionic surfactants.

Of these, anionic surfactants may be used from the viewpoint of improving the storage stability of the resin particle dispersion.

Examples of the anionic surfactant include carboxylic acid-type anionic surfactants, sulfate-type anionic surfactants, sulfonate-type anionic surfactants, and phosphate-type anionic surfactants.

Specific examples of the anionic surfactant include fatty acid salts, rosin acid salts, naphthenic acid salts, ether carboxylic acid salts, alkenyl succinic acid salts, primary alkyl sulfates, secondary alkyl sulfates, polyoxyethylene alkyl sulfates, polyoxyethylene alkylphenyl sulfates, monoacylglycerol sulfates, acylamino sulfates, sulfated oils, sulfated fatty acid alkyl esters, α-olefin sulfonates, secondary alkane sulfonates, α-sulfofatty acid salts, acyl isethionates, dialkyl sulfosuccinates, alkylbenzenesulfonates, alkylnaphthalenesulfonates, alkyl diphenyl ether disulfonates, petroleum sulfonates, lignin sulfonates, alkyl phosphates, polyoxyethylene alkyl phosphates, polyoxyethylene alkylphenyl phosphates, perfluoroalkyl carboxylates, perfluoroalkyl sulfonates, and perfluoroalkyl phosphates.

Of these, sulfate-type or sulfonate-type anionic surfactants are more preferable, and sulfonate-type anionic surfactants are particularly preferable, from the viewpoint of improving the storage stability of the resin particle dispersion.

From the viewpoint of improving the storage stability of the resin particle dispersion, the content of the surfactant is preferably from 0.1% by mass to 10% by mass inclusive and more preferably from 0.5% by mass to 5% by mass inclusive based on the mass of the resin.

(Properties of Resin Particle Dispersion)

The volume average particle diameter of the resin particles in the resin particle dispersion according to the present exemplary embodiment is preferably from 65 nm to 220 nm inclusive and more preferably from 90 nm to 200 nm inclusive.

In the resin particle dispersion according to the present exemplary embodiment, even when the volume average particle diameter of the resin particles is in the above range, the yield is high, and the resin particle dispersion has a narrow particle size distribution.

The volume average particle diameter of the resin particles is measured as follows. A particle size distribution measured using a laser diffraction particle size measurement apparatus (e.g., LA-700 manufactured by HORIBA Ltd.) is used and divided into different particle diameter ranges (channels), and a cumulative volume distribution is computed from the small particle diameter side. The particle diameter at which the cumulative frequency is 50% relative to the total number of particles is measured as the volume average particle diameter D50v.

In the resin particle dispersion according to the present exemplary embodiment, the content of the residual organic solvent is preferably from 25 ppm to 3000 ppm inclusive and more preferably from 100 ppm to 1500 ppm inclusive. The term "ppm" means the mass ratio in the resin particle dispersion after removal of the organic solvent.

When the content of the residual organic solvent in the resin particle dispersion is 25 ppm or more, the degree of reduction in the yield due to the adhesion of the resin to the inner wall surface of the distillation tank can be easily reduced. This may be because, since the resin particles containing the organic solvent have some flexibility, the dispersion stability against foam breaking on the tank wall surface and stress due to an increase in the concentration of solids can be easily maintained.

When the content of the residual organic solvent in the resin particle dispersion is 3000 ppm or less, aggregation of the resin particles may be prevented, and the storage stability of the resin particle dispersion may be improved.

To adjust the content of the residual organic solvent to the above range, for example, a method may be used in which the amount of the distillate to be collected is computed in advance using the amount of the phase-inverted emulsion before distillation and the amount of the organic solvent component contained in the phase-inverted emulsion.

The concentration of solids in the resin particle dispersion according to the present exemplary embodiment may be appropriately selected as needed. The solid concentration is preferably from 1% by mass to 60% by mass inclusive, more preferably from 5% by mass to 50% by mass inclusive, and particularly preferably from 10% by mass to 50% by mass inclusive.

(Applications)

The resin particle dispersion production method according to the present exemplary embodiment is typically used as a method for producing a resin particle dispersion for a toner.

Other examples of the application of the method include methods for producing resin particle dispersions for inkjet inks, cosmetics, powder coatings, various coatings, and electronic paper inks.

<Toner Production Method/Toner>

A toner production method according to an exemplary embodiment includes the steps of:

forming aggregated particles by aggregating, in a dispersion containing resin particles in a resin particle dispersion obtained by the resin particle dispersion production method according to the preceding exemplary embodiment, at least the resin particles (this step is hereinafter referred to as an aggregated particle forming step);

and fusing and coalescing the aggregated particles by heating an aggregated particle dispersion containing the aggregated particles dispersed therein to thereby form toner particles (this step is hereinafter referred to as a fusion/coalescence step).

A toner according to an exemplary embodiment contains toner particles obtained by the toner production method according to the above exemplary embodiment.

The above steps will next be described in detail.

In the following description, a method for obtaining toner particles containing a coloring agent and a release agent will be described, but the coloring agent and the release agent are used optionally. Of course, additional additives other than the coloring agent and the release agent may be used.

—Resin Particle Dispersion Preparing Step—

In a resin particle dispersion preparing step, a resin particle dispersion, a coloring agent particle dispersion, and a release agent particle dispersion are prepared.

Resin Particle Dispersion

The resin particle dispersion is produced using the resin particle dispersion production method according to the preceding exemplary embodiment.

However, a resin particle dispersion other than the resin particle dispersion obtained using the resin particle dispersion production method according to the preceding exemplary embodiment may also be used.

Coloring Agent Particle Dispersion

The coloring agent particle dispersion is a dispersion obtained by dispersing a coloring agent in at least an aqueous medium.

Examples of the coloring agent include: various pigments such as carbon black, chrome yellow, Hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as acridine-based dyes, xanthene-based dyes, azo-based dyes, benzoquinone-based dyes, azine-based dyes, anthraquinone-based dyes, thioindigo-based dyes, dioxazine-based dyes, thiazine-based dyes, azomethine-based dyes, indigo-based dyes, phthalocyanine-based dyes, aniline black-based dyes, polymethine-based dyes, triphenylmethane-based dyes, diphenylmethane-based dyes, and thiazole-based dyes.

One of these coloring agents may be used alone, or two or more of them may be used in combination.

The coloring agent is dispersed in an aqueous medium using a well-known method. For example, a rotary shearing-type homogenizer, a media-type disperser such as a ball mill, a sand mill, or an attritor, or a high-pressure counter collision-type disperser may be used. The coloring agent may be dispersed in the aqueous medium using a polar ionic surfactant and using a homogenizer to thereby produce the coloring agent particle dispersion.

The volume average particle diameter of the coloring agent is preferably 1 μm or less, more preferably 0.5 μm or less, and particularly preferably from 0.01 μm to 0.5 μm inclusive.

A dispersant may be added in order to improve the dispersion stability of the coloring agent in the aqueous medium to thereby reduce the energy of the coloring agent in the toner, and examples of the dispersant include rosin, rosin derivatives, coupling agents, and polymeric dispersants.

Release Agent Particle Dispersion

The release agent particle dispersion is a dispersion obtained by dispersing a release agent in at least an aqueous medium.

Examples of the release agent include: hydrocarbon-based waxes; natural waxes such as carnauba wax, rice wax, and candelilla wax; synthetic and mineral/petroleum-based waxes such as montan wax; and ester-based waxes such as fatty acid esters and montanic acid esters. The release agent used is not limited to the above release agents.

One of these release agents may be used alone, or two or more of them may be used in combination.

The melting temperature of the release agent is preferably from 50° C. to 110° C. inclusive and more preferably from 60° C. to 100° C. inclusive.

The melting temperature is determined using a DSC curve obtained by differential scanning calorimetry (DSC) from "peak melting temperature" described in melting temperature determination methods in "Testing methods for transition temperatures of plastics" in JIS K7121-1987.

The release agent is dispersed in the aqueous medium using a well-known method. For example, a rotary shearing-type homogenizer, a media-type disperser such as a ball mill, a sand mill, or an attritor, or a high-pressure counter collision-type disperser may be used. The release agent may be dispersed in the aqueous medium using a polar ionic surfactant and using a homogenizer to thereby produce the release agent particle dispersion.

The volume average particle diameter of the release agent particles is preferably 1 μm or less and more preferably from 0.01 μm to 1 μm inclusive.

—Aggregated Particle Forming Step—

Next, the resin particle dispersion, the coloring agent particle dispersion, and the release agent particle dispersion are mixed.

Then the resin particles, the coloring agent particles, and the release agent particles are hetero-aggregated in the dispersion mixture to form aggregated particles containing the resin particles, the coloring agent particles, and the release agent particles and having diameters close to the diameters of target toner particles.

Specifically, for example, a flocculant is added to the dispersion mixture, and the pH of the dispersion mixture is adjusted to acidic (for example, a pH of from 2 to 5 inclusive). Then a dispersion stabilizer is optionally added, and the resulting mixture is heated to the glass transition temperature of the resin particles (specifically, for example, a temperature equal to higher than the glass transition temperature of the resin particles−30° C. and equal to or lower than the glass transition temperature−10° C.) to aggregate the particles dispersed in the dispersion mixture to thereby form aggregated particles.

In the aggregated particle forming step, for example, the flocculant is added at room temperature (e.g., 25° C.) while the dispersion mixture is agitated in a rotary shearing-type homogenizer. Then the pH of the dispersion mixture is adjusted to acidic (e.g., a pH of from 2 to 5 inclusive), and the dispersion stabilizer is optionally added. Then the resulting mixture is heated in the manner described above.

Examples of the flocculant include a surfactant with a polarity opposite to the polarity of the surfactant added to the dispersion mixture, inorganic metal salts, and divalent or higher polyvalent metal complexes. In particular, when a metal complex is used as the flocculant, the amount of the surfactant used can be reduced, and charging characteristics may be improved.

An additive that forms a complex with a metal ion in the flocculant or a similar bond may be optionally used. The additive used may be a chelating agent.

Examples of the inorganic metal salts include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

The chelating agent used may be a water-soluble chelating agent. Examples of the chelating agent include: oxycarboxylic acids such as tartaric acid, citric acid, and gluconic acid; iminodiacetic acid (IDA); nitrilotriacetic acid (NTA); and ethylenediaminetetraacetic acid (EDTA).

The amount of the chelating agent added is, for example, preferably from 0.01 parts by mass to 5.0 parts by mass inclusive and more preferably 0.1 parts by mass or more and less than 3.0 parts by mass based on 100 parts by mass of the resin particles.

—Fusion/Coalescence Step—

Next, the aggregated particle dispersion containing the aggregated particles dispersed therein is heated, for example, to a temperature equal to or higher than the glass transition temperature of the resin particles (e.g., a temperature higher by 10° C. to 30° C. than the glass transition temperature of the resin particles) to fuse and coalesce the aggregated particles to thereby form toner particles.

The toner particles are obtained through the above-described steps.

Alternatively, the toner particles may be produced through: the step of, after the preparation of the aggregated particle dispersion containing the aggregated particles dispersed therein, mixing the aggregated particle dispersion further with the resin particle dispersion containing the resin particles dispersed therein and then causing the resin particles to adhere to the surface of the aggregated particles to aggregate them to thereby form second aggregated particles; and the step of heating a second aggregated particle dispersion containing the second aggregated particles dispersed therein to fuse and coalesce the second aggregated particles to thereby form toner particles having a core-shell structure.

After completion of the fusion/coalescence step, the toner particles formed in the solution are subjected to a well-known washing step, a solid-liquid separation step, and a drying step to obtain dried toner particles.

From the viewpoint of chargeability, the toner particles may be subjected to displacement washing with ion exchanged water sufficiently in the washing step. No particular limitation is imposed on the solid-liquid separation step. From the viewpoint of productivity, suction filtration, pressure filtration, etc. may be performed in the solid-liquid separation step. No particular limitation is imposed on the drying step. From the viewpoint of productivity, freeze-drying, flash drying, fluidized drying, vibrating fluidized drying, etc. may be performed in the drying step.

The toner according to the present exemplary embodiment is produced, for example, by adding an external additive to the dried toner particles obtained and mixing them. The mixing may be performed, for example, using a V blender, a Henschel mixer, a Loedige mixer, etc. If necessary, coarse particles in the toner may be removed using a vibrating sieving machine, an air sieving machine, etc.

Examples of the external additive include inorganic particles. Examples of the inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, and $MgSO_4$.

The surface of the inorganic particles used as the external additive may be subjected to hydrophobic treatment. The hydrophobic treatment is performed, for example, by immersing the inorganic particles in a hydrophobic treatment agent. No particular limitation is imposed on the hydrophobic treatment agent, and examples of the hydrophobic treatment agent include silane-based coupling agents, silicone oils, titanate-based coupling agents, and aluminum-based coupling agents. One of these may be used alone, or two or more of them may be used in combination.

The amount of the hydrophobic treatment agent is generally, for example, from 1 part by mass to 10 parts by mass inclusive based on 100 parts by mass of the inorganic particles.

Other examples of the external additive include resin particles (particles of resins such as polystyrene, polymethyl methacrylate (PMMA), and melamine resins) and cleaning activators (such as metal salts of higher fatty acids typified by zinc stearate and fluorine-based polymer particles).

The amount of the external additive added externally is, for example, preferably from 0.01% by mass to 5% by mass inclusive and more preferably from 0.01% by mass to 2.0% by mass inclusive relative to the mass of the toner particles.

—Properties of Toner—

In the toner according to the present exemplary embodiment, the toner particles may have a single layer structure or may be toner particles each having a so-called core-shell structure including a core (core particle) and a coating layer (shell layer) covering the core.

The toner particles having the core-shell structure may each include, for example: a core containing the binder resin and optional additives such as the coloring agent and the release agent; and a coating layer containing the binder resin.

The volume average particle diameter (D50v) of the toner particles is preferably from 2 μm to 10 μm inclusive and more preferably from 4 μm to 8 μm inclusive.

The volume average particle diameters of the toner particles and their grain size distribution indexes are measured using Coulter Multisizer II (manufactured by Beckman Coulter, Inc.), and ISOTON-II (manufactured by Beckman Coulter, Inc.) is used as an electrolyte.

In the measurement, 0.5 mg to 50 mg of a measurement sample is added to 2 mL of a 5% aqueous solution of a surfactant (preferably sodium alkylbenzenesulfonate) serving as a dispersant. The mixture is added to 100 mL to 150 mL of the electrolyte.

The electrolyte with the sample suspended therein is subjected to dispersion treatment for 1 minute using an ultrasonic dispersion apparatus, and then the particle size distribution of particles having diameters within the range of 2 μm to 60 μm is measured using the Coulter Multisizer II with an aperture having an aperture diameter of 100 μm. The number of particles sampled is 50,000.

The particle size distribution measured and divided into particle size ranges (channels) is used to obtain volume-based and number-based cumulative distributions computed from the small diameter side. In the computed volume-based cumulative distribution, the particle diameter at a cumulative frequency of 16% is defined as a volume-based particle diameter D16v, and the particle diameter at a cumulative frequency of 50% is defined as a volume-based particle diameter D50v. The particle diameter at a cumulative frequency of 84% is defined as a volume-based particle diameter D84v. In the number-based cumulative distribution, the particle diameter at a cumulative frequency of 16% is defined as a number-based particle diameter D16p, and the particle diameter at a cumulative frequency of 50% is defined as a number average cumulative particle diameter D50p. Moreover, the particle diameter at a cumulative frequency of 84% is defined as a number-based particle diameter D84p.

These are used to compute a volume-based grain size distribution index (GSDv) defined as $(D84v/D16v)^{1/2}$ and a number-based grain size distribution index (GSDp) defined as $(D84p/D16p)^{1/2}$.

The average circularity of the toner particles is preferably from 0.94 to 1.00 inclusive and more preferably from 0.95 to 0.98 inclusive.

The circularity of a toner particle is determined as (the peripheral length of an equivalent circle of the toner particle)/(the peripheral length of the toner particle) [i.e., (the peripheral length of a circle having the same area as a projection image of the particle)/(the peripheral length of the projection image of the particle)]. Specifically, the average circularity is a value measured by the following method.

First, the toner particles used for the measurement are collected by suction, and a flattened flow of the particles is formed. Particle images are captured as still images using flashes of light, and the average circularity is determined by subjecting the particle images to image analysis using a flow-type particle image analyzer (FPIA-3000 manufactured by SYSMEX Corporation). The number of particles sampled for determination of the average circularity is 3500.

When the toner contains the external additive, the toner (developer) for the measurement is dispersed in water containing a surfactant, and the dispersion is subjected to ultrasonic treatment. The toner particles with the external additive removed are thereby obtained.

<Electrostatic Image Developer>

An electrostatic image developer according to an exemplary embodiment contains at least the toner according to the preceding exemplary embodiment.

The electrostatic image developer according to the present exemplary embodiment may be a one-component developer containing only the toner according to the preceding exemplary embodiment or a two-component developer containing the toner and a carrier.

No particular limitation is imposed on the carrier, and a well-known carrier may be used. Examples of the carrier include: a coated carrier prepared by coating the surface of a core material formed of a magnetic powder with a coating resin; a magnetic powder-dispersed carrier prepared by dispersing a magnetic powder in a matrix resin; and a resin-impregnated carrier prepared by impregnating a porous magnetic powder with a resin.

In each of the magnetic powder-dispersed carrier and the resin-impregnated carrier, the particles included in the carrier may be used as cores, and the cores may be coated with a coating resin.

EXAMPLES

Examples of the present disclosure will be described. However, the present disclosure is not limited to these Examples. In the following description, "parts" and "%" are all based on mass, unless otherwise specified.

<Synthesis of Polyester Resin (1)>

A reaction vessel equipped with a stirrer, a thermometer, a condenser, and a nitrogen gas introduction tube is charged with raw materials including 5 parts by mole of ethylene oxide 2 mol adduct of bisphenol A, 45 parts by mole of propylene oxide 2 mol adduct of bisphenol A, 40 parts by mole of terephthalic acid, 10 parts by mole of isophthalic acid, and 10 parts by mole of n-dodecenyl succinic acid and also with dibutyl tin oxide used as a catalyst. Nitrogen gas is introduced into the vessel, and the vessel is heated while the inert atmosphere is maintained. Then a co-condensation polymerization reaction is allowed to proceed at 230° C. for about 12 hours, and the pressure is gradually reduced at 200° C. to thereby synthesize a polyester resin (1).

The polyester resin (1) obtained has a weight average molecular weight (Mw) of 17100, an acid value of 12.5 mg KOH/g, a glass transition temperature (Tg) of 58° C., and a melting point (Tm) of 109° C.

<Synthesis of Polyester Resin (2)>

A reaction vessel equipped with a stirrer, a thermometer, a condenser, and a nitrogen gas introduction tube is charged with raw materials including 3 parts by mole of ethylene oxide 2 mol adduct of bisphenol A, 57 parts by mole of propylene oxide 2 mol adduct of bisphenol A, 15 parts by mole of terephthalic acid, and 35 parts by mole fumaric acid and also with dibutyl tin oxide used as a catalyst. Nitrogen gas is introduced into the vessel, and the vessel is heated while the inert atmosphere is maintained. Then a co-condensation polymerization reaction is allowed to proceed at 250° C. for about 8 hours, and the pressure is gradually reduced at 220° C. to thereby synthesize a polyester resin (2).

The polyester resin (2) obtained has a weight average molecular weight (Mw) of 23000, an acid value of 15.0 mg KOH/g, a glass transition temperature (Tg) of 62° C., and a melting point (Tm) of 106° C.

Example 1

—Production of Resin Particle Dispersions in First Production Cycle—

The production apparatus shown in FIG. 1 is used to produce resin particle dispersions in a first production cycle as follows.

A resin particle dispersion is produced in the first production line 100A as follows.

The emulsification tank 10A equipped with the agitator 11a and a thermometer is charged with 90 parts of ethyl acetate and 25 parts of isopropanol used as the organic solvents and with 100 parts of the polyester resin (1) used as the resin. The mixture is agitated at 70° C. for 30 minutes to dissolve the resin. 4 Parts of 10% by mass ammonia water used as the neutralizer is added to the obtained solution, and then 300 parts of pure water at 65° C. is gradually added to the mixture to thereby obtain a phase-inverted emulsion. Then the obtained phase-inverted emulsion is delivered to the distillation tank 20A equipped with the agitator 21A and a thermometer.

The pressure inside the distillation tank 20A is reduced to 8 kPa, and the phase-inverted emulsion is heated to 65° C. to subject the phase-inverted emulsion to reduced pressure distillation. The evaporated organic solvent-containing water vapor is cooled by the condenser 54A, and the composition of the distillate is detected using the analysis unit 55A. When the aqueous medium concentration is 95% or lower, the distillate is collected in the first distillate collection tank 30A. When the aqueous medium concentration is more than 95%, the distillate is collected in the second distillate collection tank 31A.

In parallel with the first production line 100A, a resin particle dispersion is produced in the second production line 100B as follows.

The emulsification tank 10B equipped with the agitator 11B and a thermometer is charged with 45 parts of ethyl acetate and 18 parts of isopropanol used as the organic solvents and with 100 parts of the polyester resin (2) used as the resin, and the mixture is agitated at 70° C. for 30 minutes to dissolve the resin. 5 Parts of 10% by mass ammonia water used as the neutralizer is added to the obtained solution, and then 350 parts of pure water at 65° C. is gradually added to the mixture to thereby obtain a phase-inverted emulsion. Then the obtained phase-inverted emulsion is delivered to the distillation tank 20B equipped with the agitator 21B and a thermometer.

The pressure inside the distillation tank 20B is reduced to 8 kPa, and the phase-inverted emulsion is heated to 65° C. to subject the phase-inverted emulsion to reduced pressure distillation. The evaporated organic solvent-containing water vapor is cooled by the condenser 54B, and the composition of the distillate is detected using the analysis unit 55B. When the aqueous medium concentration is 95% or lower, the distillate is collected in the first distillate collection tank 30B. When the aqueous medium concentration is more than 95%, the distillate is collected in the second distillate collection tank 31B.

The distillates collected in the first distillate collection tanks 30A and 30B of the first and second production lines 100A and 100B are delivered to the first reusable distillate storage tank 200A and agitated until uniform, and the composition of the resulting distillate stored in the first reusable distillate storage tank 200A is analyzed. The composition of the distillate is found to be ethyl acetate 43.3% by mass, isopropanol 13.6% by mass, ammonia 0.3% by mass, and water 42.8% by mass, and the total amount of the distillate is 306 parts.

The distillates collected in the second distillate collection tanks 31A and 31B of the first and second production lines 100A and 100B are delivered to the second reusable distillate storage tank 200B and agitated until uniform, and the composition of the distillate stored in the second reusable distillate storage tank 200B is analyzed. The composition of the distillate is found to be ethyl acetate 2.3% by mass, isopropanol 1.1% by mass, ammonia 0.2% by mass, and water 96.4% by mass, and the total amount of the distillate is 119 parts.

—Production of Resin Particle Dispersions in Second Production Cycle—

The production apparatus shown in FIG. 1 is used to produce resin particle dispersions in a second production cycle using the same procedure as in the first production cycle except that the polyester resin (1) is used in both the first and second production lines 100A and 100B and that the mixing ratio of the organic solvents is set to "ethyl acetate 90 parts/isopropanol 25 parts."

The amount of the reusable distillate to be used as the organic solvents is determined using the mixing ratio of the organic solvents (ethyl acetate 90 parts/isopropanol 25 parts) and the mixing ratio of the organic solvents in the distillate stored in the first reusable distillate storage tank 200A in the first production cycle (43.3% by mass/13.6% by mass). The amount determined is 183 parts, and the amount of an additional organic solvent to be used is determined to be 10.7 parts of ethyl acetate.

183 Parts of the distillate stored in the first reusable distillate storage tank 200A in the first production cycle and used as the organic solvents, 10.7 parts of additional ethyl acetate, and 100 parts of the polyester resin (1) used as the resin are added to each of the emulsification tanks 10A and 10B, and the mixtures are agitated at 70° C. for 30 minutes to dissolve the resin. 3.5 Parts of 10% by mass ammonia water used as the neutralizer is added to each of the obtained solutions, and then 262 parts of pure water at 65° C. is gradually added to each of the resulting solutions to subject the resin to phase inversion emulsification.

Then 38 parts of the distillate stored in the second reusable distillate storage tank 200B in the first production cycle is delivered as replenishment water to each of the emulsification tanks 10A and 10B.

The use rate of the additional organic solvent in the second production cycle is computed as (the amount of additional ethyl acetate+the amount of additional isopropanol)/(the amount of additional ethyl acetate+the amount of ethyl acetate in the distillate+the amount of additional isopropanol+the amount of isopropanol in the distillate)× 100. The use rate of the additional organic solvent in the second production cycle is found to be 9.3%.

Example 2

—Production of Resin Particle Dispersions in First Production Cycle—

The same procedure as in Example 1 is repeated to produce a resin particle dispersion of the polyester resin (1) in the first production line 100A and a resin particle dispersion of the polyester resin (2) in the second production line 100B.

—Production of Resin Particle Dispersion in Second Production Cycle—

The production apparatus shown in FIG. 1 is used to produce resin particle dispersions in a second production cycle using the same procedure as in the first production cycle except that the polyester resin (2) is used in both the first and second production lines 100A and 100B and that the mixing ratio of the organic solvents is set to "ethyl acetate 45 parts/isopropanol 18 parts."

The amount of the reusable distillate to be used as the organic solvents is determined using the mixing ratio of the organic solvents (ethyl acetate 45 parts/isopropanol 18 parts) and the mixing ratio of the organic solvents in the distillate stored in the first reusable distillate storage tank 200A in the first production cycle (43.3% by mass/13.6% by mass). The amount determined is 104 parts, and the amount of an additional organic solvent to be used is determined to be 3.8 parts of isopropanol.

104 Parts of the distillate stored in the first reusable distillate storage tank 200A in the first production cycle and used as the organic solvents, 3.8 parts of additional isopropanol, and 100 parts of the polyester resin (2) are added to each of the emulsification tanks 10A and 10B, and the mixtures are agitated at 70° C. for 30 minutes to dissolve the resin. 4.7 Parts of 10% by mass ammonia water used as the neutralizer is added to each of the obtained solutions, and then 269 parts of pure water at 65° C. is gradually added to each of the resulting solutions to subject the resin to phase inversion emulsification.

Then 81 parts of the distillate stored in the second reusable distillate storage tank 200B in the first production cycle is delivered as replenishment water to each of the emulsification tanks 10A and 10B.

The use rate of the additional organic solvent in the second production cycle is computed as (the amount of additional ethyl acetate+the amount of additional isopropanol)/(the amount of additional ethyl acetate+the amount of ethyl acetate in the distillate+the amount of additional isopropanol+the amount of isopropanol in the distillate)× 100. The use rate of the additional organic solvent in the second production cycle is found to be 6.1%.

Example 3

—Production of Resin Particle Dispersions in First Production Cycle—

The production apparatus shown in FIG. 2 is used to produce resin particle dispersions in a first production cycle as follows.

A resin particle dispersion is produced in the first production line 100A as follows.

The emulsification tank 10A equipped with the agitator 11a and a thermometer is charged with 150 parts of ethyl acetate and 40 parts of isopropanol used as the organic solvents and with 100 parts of the polyester resin (1) used as the resin. The mixture is agitated at 70° C. for 30 minutes to dissolve the resin. 4 Parts of 10% by mass ammonia water used as the neutralizer is added to the obtained solution, and then 300 parts of pure water at 65° C. is gradually added to the mixture to thereby obtain a phase-inverted emulsion. Then the obtained phase-inverted emulsion is delivered to the distillation tank 20A equipped with the agitator 21A and a thermometer.

The pressure inside the distillation tank 20A is reduced to 8 kPa, and the phase-inverted emulsion is heated to 65° C. to subject the phase-inverted emulsion to reduced pressure distillation. The evaporated organic solvent-containing water vapor is cooled by the condenser 54A, and collection of the distillate in the first distillate collection tank 30A is started. Before the aqueous medium concentration has been increased to 95% or more, the first distillate collection tank 30A has become full. In this case, the collection tank is changed to the third distillate collection tanks 32A. Then, when the aqueous medium concentration in the distillate measured using the analysis unit 55B is increased to 95% or more, the collection tank is changed to the second distillate collection tank 31A to collect the distillate.

In parallel with the first production line 100A, a resin particle dispersion is produced in the second production line 100B as follows.

The emulsification tank 10B equipped with the agitator 11B and a thermometer is charged with 40 parts of ethyl acetate and 15 parts of isopropanol used as the organic solvents and with 100 parts of the polyester resin (1) as the resin, and the mixture is agitated at 70° C. for 30 minutes to dissolve the resin. 5 Parts of 10% by mass ammonia water used as the neutralizer is added to the obtained solution, and then 600 parts of pure water at 65° C. is gradually added to the resulting mixture to thereby obtain a phase-inverted emulsion. Then the obtained phase-inverted emulsion is delivered to the distillation tank 20B equipped with the agitator 21B and a thermometer.

The pressure inside the distillation tank 20B is reduced to 8 kPa, and the phase-inverted emulsion is heated to 65° C. to subject the phase-inverted emulsion to reduced pressure distillation. The evaporated organic solvent-containing water vapor is cooled by the condenser 54B, and collection of the distillate in the first distillate collection tank 30B is started. The composition of the distillate is detected using the analysis unit 55B. When the aqueous medium concentration is increased to 95% or more, the collection tank is changed to the second distillate collection tank 31B. The second distillate collection tank 31B has become full before completion of the distillation. In this case, the collection tank is changed to the third distillate collection tanks 32B to collect the distillate.

The distillates collected in the first distillate collection tank 30A and the third distillate collection tank 32A in the first production line 100A and the distillate collected in the first distillate collection tank 30B in the second production line 100B are delivered to the first reusable distillate storage tank 200A and agitated to uniform, and the composition of the resulting distillate stored in the first reusable distillate storage tank 200A is analyzed. The composition of the distillate is found to be ethyl acetate 44.4% by mass, isopropanol 12.7% by mass, ammonia 0.2% by mass, and water 42.7% by mass, and the total amount of the distillate is found to be 419 parts.

The distillate collected in the second distillate collection tank 31A in the first production line 100A and the distillates collected in the second distillate collection tank 31B and the third distillate collection tank 32B in the second production line 100B are delivered to the second reusable distillate storage tank 200B and agitated to uniform, and the composition of the resulting distillate stored in the second reusable distillate storage tank 200B is analyzed. The composition of the distillate is found to be ethyl acetate 1.2% by mass, isopropanol 0.5% by mass, ammonia 0.1% by mass, and water 98.2% by mass, and the total amount of the distillate is found to be 317 parts.

—Production of Resin Particle Dispersion in Second Production Cycle—

The production apparatus shown in FIG. 2 is used to produce resin particle dispersions in a second production cycle using the same procedure as in the first production cycle except that the polyester resin (1) is used in both the first and second production lines 100A and 100B and that the mixing ratio of the organic solvents is set to "ethyl acetate 40 parts/isopropanol 15 parts."

The amount of the reusable distillate to be used as the organic solvents is determined using the mixing ratio of the organic solvents (ethyl acetate 40 parts/isopropanol 15 parts) and the mixing ratio of the organic solvents (44.4% by mass/12.7% by mass) in the distillate stored in the first reusable distillate storage tank 200A in the first production cycle. The amount determined is 90 parts, and the amount of an additional organic solvent to be used is determined to be 3.5 parts % by mass of isopropanol.

90 Parts of the distillate stored in the first reusable distillate storage tank 200A in the first production cycle and used as the organic solvents, 3.5 parts of additional ethyl acetate, and 100 parts of the polyester resin (1) used as the resin are added to each of the emulsification tanks 10A and 10B, and the mixtures are agitated at 70° C. for 30 minutes to dissolve the resin. 4.8 Parts of 10% by mass ammonia water used as the neutralizer is added to each of the obtained solutions, and then 316 parts of pure water at 65° C. is gradually added to each of the resulting solutions to subject the resin to phase inversion emulsification.

Then 284 parts of the distillate stored in the second reusable distillate storage tank 200B in the first production cycle is delivered as replenishment water to each of the emulsification tanks 10A and 10B.

The use rate of the additional organic solvent in the second production cycle is computed as (the amount of additional ethyl acetate+the amount of additional isopropanol)/(the amount of additional ethyl acetate+the amount of ethyl acetate in the distillate+the amount of additional isopropanol+the amount of isopropanol in the distillate)× 100. The use rate of the additional organic solvent in the second production cycle is found to be 6.4%.

Comparative Example 1

Figure 3:
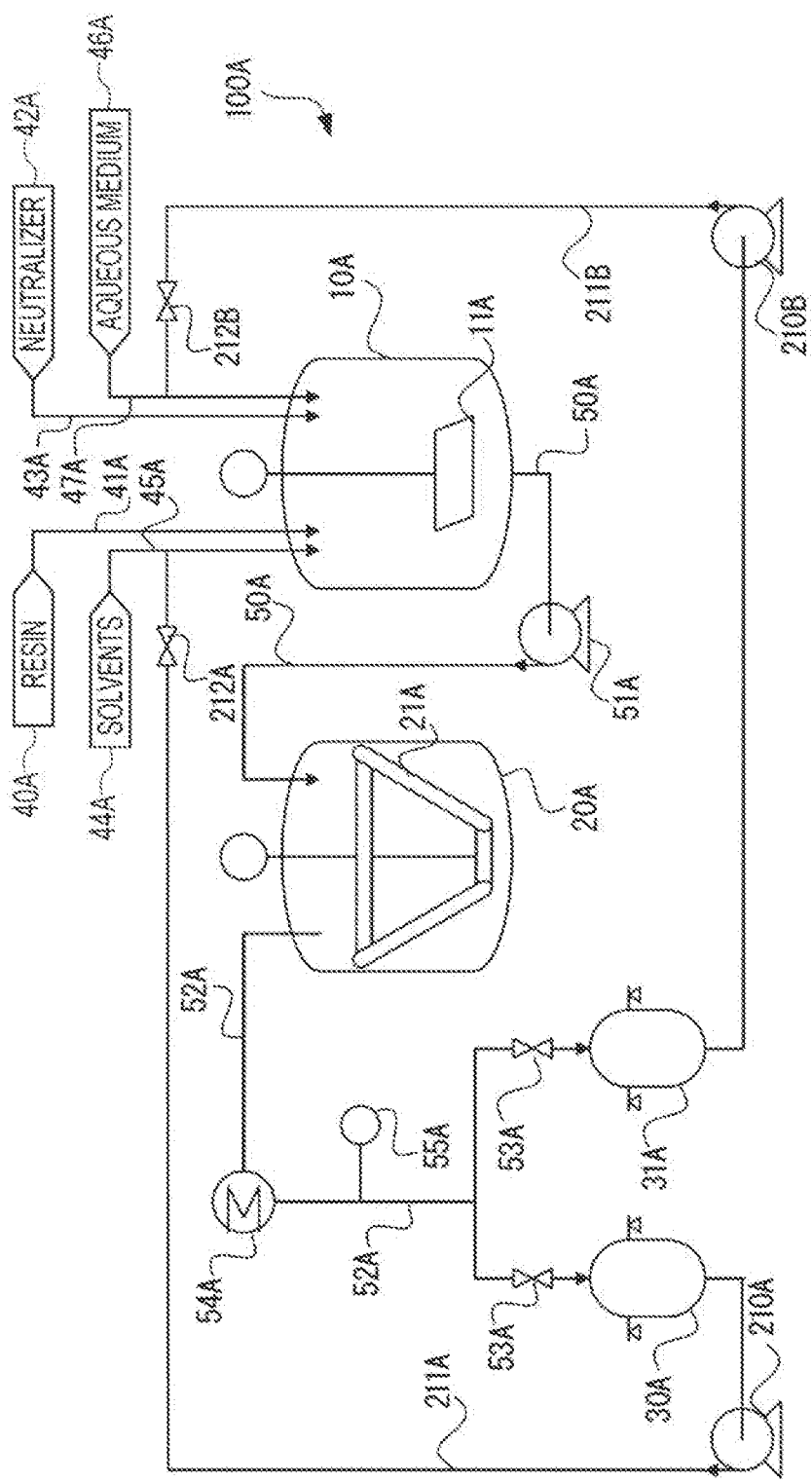
FIG. 3 is a schematic configuration diagram showing an example of a production apparatus used for a resin particle dispersion production method in a Comparative Example.

A production apparatus shown in FIG. 3 is prepared. This production apparatus has the same structure as that of the production apparatus shown in FIG. 1 except that the production apparatus includes only the first production line 100A and that the distillate collected in the first distillate collection tank 30A and the distillate collected in the second distillate collection tank 31A are delivered directly to the emulsification tank 10A.

In FIG. 3, 211A denotes a first distillate delivery tube that connects the first distillate collection tank 30A to the emulsification tank 10A, and 211B denotes a second distillate delivery tube that connects the second distillate collection tank 31A to the emulsification tank 10A. 210A and 210B denote pumps, and 212A and 212B denote valves.

A resin particle dispersion in a first production cycle is produced under the same conditions as those for the second production line 100B in Example 1 except that the production apparatus shown in FIG. 3 is used, and a resin particle dispersion in a second production cycle is produced under the same conditions as those for the first production line 100A in Example 1 except that the production apparatus shown in FIG. 3 is used.

In the production of the resin particle dispersion in the second production cycle, the amount of the distillate collected in the first distillate collection tank 30A and reused as the organic solvents is computed using the mixing ratio of the organic solvent in the distillate in the first distillate collection tank 30B (ethyl acetate 41.2% by mass/isopropanol 16.3% by mass). The computed amount is 153 parts, and the amount of an additional organic solvent to be used is determined to be 26.9 parts of ethyl acetate.

The use rate of the additional organic solvent in the second production cycle is computed as (the amount of additional ethyl acetate+the amount of additional isopropanol)/(the amount of additional ethyl acetate+the amount of ethyl acetate in the distillate+the amount of additional isopropanol+the amount of isopropanol in the distillate)× 100. The use rate of the additional organic solvent in the second production cycle is found to be 23.4%.

As can be seen from the above results, with the resin particle dispersion production methods in the Examples, the amount of waste distillates can be smaller than that in the Comparative Example.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a resin particle dispersion, the method comprising:
    using a resin particle dispersion production apparatus including:
    two or more resin particle dispersion production lines each including an emulsification tank in which a resin is subjected to phase inversion emulsification using two or more organic solvents and an aqueous medium to thereby obtain a phase-inverted emulsion, a distillation tank in which the organic solvents are removed from the phase-inverted emulsion by reduced pressure distillation to thereby obtain a resin particle dispersion, and a plurality of distillate collection tanks that collect distillates formed during the reduced pressure distillation according to respective target distillate compositions; and
    a reusable distillate storage tank A that collects and stores a distillate collected in at least one distillate collection tank A among the distillates collected in the plurality of distillate collection tanks in each of the two or more resin particle dispersion production lines,
    wherein the distillate collected in the reusable distillate storage tank A is delivered to the emulsification tank in at least one resin particle dispersion production line among the two or more resin particle dispersion production lines to reuse the distillate for production of a phase-inverted emulsion in the at least one resin particle dispersion production line.

2. The method for producing a resin particle dispersion according to claim 1, wherein the reuse amount of the distillate to be reused is determined using the mixing ratio of the two or more organic solvents in the distillate stored in the reusable distillate storage tank A and the mixing ratio of the two or more organic solvents at the time of the production of the phase-inverted emulsion in the at least one resin particle dispersion production line, and wherein the determined reuse amount of the distillate in the reusable distillate storage tank A is delivered from the reusable distillate storage tank A to the emulsification tank in the at least one resin particle dispersion production line to reuse the distillate for the production of the phase-inverted emulsion in the at least one resin particle dispersion production line.

3. The method for producing a resin particle dispersion according to claim 1, wherein the distillate composition of each of the distillates formed during the reduced pressure distillation is analyzed using at least one type of measurement selected from the group consisting of weight measurement, gas chromatography measurement, liquid chromatography measurement, infrared spectroscopy measurement, ultrasonic propagation velocity measurement, neutralization titration, specific gravity measurement, and electric conductivity measurement, and wherein each distillate is collected in one of the distillate collection tanks that is determined according to a target distillate composition.

4. The method for producing a resin particle dispersion according to claim 2, wherein the distillate composition of each of the distillates formed during the reduced pressure distillation is analyzed using at least one type of measurement selected from the group consisting of weight measurement, gas chromatography measurement, liquid chromatography measurement, infrared spectroscopy measurement, ultrasonic propagation velocity measurement, neutralization titration, specific gravity measurement, and electric conductivity measurement, and wherein each distillate is collected in one of the distillate collection tanks that is determined according to a target distillate composition.

5. The method for producing a resin particle dispersion according to claim 1, wherein the mixing ratio of the two or more organic solvents in the distillate stored in the reusable distillate storage tank A is computed using the mixing ratio of the two or more organic solvents at the time of production of the phase-inverted emulsion in each of the two or more resin particle dispersion production lines, the amounts of the organic solvents at the time of production of the phase-inverted emulsion in each of the two or more resin particle dispersion production lines, the amount of the distillate collected in the distillate collection tank A in each of the two or more resin particle dispersion production lines, and the amount of the distillate stored in the reusable distillate storage tank A.

6. The method for producing a resin particle dispersion according to claim 2, wherein the mixing ratio of the two or more organic solvents in the distillate stored in the reusable distillate storage tank A is computed using the mixing ratio of the two or more organic solvents at the time of production of the phase-inverted emulsion in each of the two or more resin particle dispersion production lines, the amounts of the organic solvents at the time of production of the phase-inverted emulsion in each of the two or more resin particle dispersion production lines, the amount of the distillate collected in the distillate collection tank A in each of the two or more resin particle dispersion production lines, and the amount of the distillate stored in the reusable distillate storage tank A.

7. The method for producing a resin particle dispersion according to claim 3, wherein the mixing ratio of the two or more organic solvents in the distillate stored in the reusable distillate storage tank A is computed using the mixing ratio of the two or more organic solvents at the time of production of the phase-inverted emulsion in each of the two or more resin particle dispersion production lines, the amounts of the organic solvents at the time of production of the phase-inverted emulsion in each of the two or more resin particle dispersion production lines, the amount of the distillate collected in the distillate collection tank A in each of the two or more resin particle dispersion production lines, and the amount of the distillate stored in the reusable distillate storage tank A.

8. The method for producing a resin particle dispersion according to claim 4, wherein the mixing ratio of the two or more organic solvents in the distillate stored in the reusable distillate storage tank A is computed using the mixing ratio of the two or more organic solvents at the time of production of the phase-inverted emulsion in each of the two or more resin particle dispersion production lines, the amounts of the organic solvents at the time of production of the phase-inverted emulsion in each of the two or more resin particle dispersion production lines, the amount of the distillate collected in the distillate collection tank A in each of the two or more resin particle dispersion production lines, and the amount of the distillate stored in the reusable distillate storage tank A.

9. The method for producing a resin particle dispersion according to claim 1, wherein the mixing ratio of the two or more organic solvents in the distillate stored in the reusable distillate storage tank A is measured using at least one type of measurement selected from the group consisting of gas chromatography measurement, liquid chromatography measurement, infrared spectroscopy measurement, ultrasonic propagation velocity measurement, neutralization titration, specific gravity measurement, and electric conductivity measurement.

10. The method for producing a resin particle dispersion according to claim 2, wherein the mixing ratio of the two or more organic solvents in the distillate stored in the reusable distillate storage tank A is measured using at least one type of measurement selected from the group consisting of gas chromatography measurement, liquid chromatography measurement, infrared spectroscopy measurement, ultrasonic propagation velocity measurement, neutralization titration, specific gravity measurement, and electric conductivity measurement.

11. The method for producing a resin particle dispersion according to claim 3, wherein the mixing ratio of the two or more organic solvents in the distillate stored in the reusable distillate storage tank A is measured using at least one type of measurement selected from the group consisting of gas chromatography measurement, liquid chromatography measurement, infrared spectroscopy measurement, ultrasonic propagation velocity measurement, neutralization titration, specific gravity measurement, and electric conductivity measurement.

12. The method for producing a resin particle dispersion according to claim 4, wherein the mixing ratio of the two or more organic solvents in the distillate stored in the reusable distillate storage tank A is measured using at least one type of measurement selected from the group consisting of gas chromatography measurement, liquid chromatography measurement, infrared spectroscopy measurement, ultrasonic propagation velocity measurement, neutralization titration, specific gravity measurement, and electric conductivity measurement.

13. The method for producing a resin particle dispersion according to claim 1, wherein the distillate stored in the reusable distillate storage tank A contains the organic solvents in an amount of 30% by mass or more.

14. The method for producing a resin particle dispersion according to claim 13, wherein the distillate stored in the reusable distillate storage tank A and containing the organic solvents in an amount of 30% by mass or more is delivered as the organic solvents to the emulsification tank in the at least one resin particle dispersion production line.

15. The method for producing a resin particle dispersion according to claim 13, wherein the resin particle dispersion production apparatus further includes a reusable distillate storage tank B that collects and stores a distillate collected in at least one distillate collection tank B among the distillates collected in the plurality of distillate collection tanks in each of the two or more resin particle dispersion production lines,
wherein the distillate stored in the reusable distillate storage tank B contains the aqueous medium in an amount of 80% by mass or more, and
wherein the distillate containing the aqueous medium in an amount of 80% by mass or more is delivered from the reusable distillate storage tank B to the emulsification tank in at least one resin particle dispersion production line among the two or more resin particle dispersion production lines to reuse the distillate for production of a phase-inverted emulsion in the at least one resin particle dispersion production line.

16. The method for producing a resin particle dispersion according to claim 15, wherein, after a resin has been subjected to phase inversion emulsification using the two or more organic solvents and the aqueous medium in the emulsification tank in the at least one resin particle dispersion production line, the distillate stored in the reusable distillate storage tank B and containing the aqueous medium in an amount of 80% by mass or more is delivered to the emulsification tank in the at least one resin particle dispersion production line.

17. The method for producing a resin particle dispersion according to claim 1, wherein, when the resin particle dispersions are produced, at least one of the types of two or more organic solvents, the mixing ratio of the two or more organic solvents, and the type of resin in any of the two or more resin particle dispersion production lines differs from in the rest of the two or more resin particle dispersion production lines, or the types of two or more organic solvents, the mixing ratio of the two or more organic solvents, and the type of resin are the same for all the two or more resin particle dispersion production lines.

18. The method for producing a resin particle dispersion according to claim 1, wherein, when a resin particle dispersion is produced in each of the two or more resin particle dispersion production lines, at least one of the types of two or more organic solvents, the mixing ratio of the two or more organic solvents, and the type of resin is changed for different production cycles, or the types of two or more organic solvents, the mixing ratio of the two or more organic solvents, and the type of resin are the same for each production cycle.

19. A method for producing a toner for electrostatic image development, the method comprising:
producing a resin particle dispersion by using a resin particle dispersion production apparatus including:
two or more resin particle dispersion production lines each including an emulsification tank in which a resin is subjected to phase inversion emulsification using two or more organic solvents and an aqueous medium to thereby obtain a phase-inverted emulsion, a distillation tank in which the organic solvents are removed from the phase-inverted emulsion by reduced pressure distillation to thereby obtain a resin particle dispersion, and a plurality of distillate collection tanks that collect distillates formed during the reduced pressure distillation according to respective target distillate compositions; and
a reusable distillate storage tank A that collects and stores a distillate collected in at least one distillate collection tank A among the distillates collected in the plurality of distillate collection tanks in each of the two or more resin particle dispersion production lines,
wherein the distillate collected in the reusable distillate storage tank A is delivered to the emulsification tank in at least one resin particle dispersion production line among the two or more resin particle dispersion production lines to reuse the distillate for production of a phase-inverted emulsion in the at least one resin particle dispersion production line;
forming aggregated particles by aggregating the resin particles;
and fusing and coalescing the aggregated particles by heating an aggregated particle dispersion containing the aggregated particles dispersed therein to thereby form toner particles.

\* \* \* \* \*